(12) United States Patent
Lee et al.

(10) Patent No.: US 8,315,180 B2
(45) Date of Patent: Nov. 20, 2012

(54) APPARATUS AND METHOD FOR SELECTING RELAY STATION MODE IN WIRELESS COMMUNICATION SYSTEM

(75) Inventors: Jong-Ho Lee, Seoul (KR); Sang-Bo Yun, Seongnam-si (KR); Sung-Hwan Kim, Suwon-si (KR); Sung-Yoon Jung, Seoul (KR); Nak-Myeong Kim, Seoul (KR); Su-Jung Shin, Seoul (KR); Hae-Lynn Kang, Seoul (KR); Hye-In Yu, Seoul (KR)

(73) Assignees: Samsung Electronics Co., Ltd (KR); Ewha University-Industry Collaboration Foundation (KR)

( * ) Notice: Subject to any disclaimer, the term of this patent is extended or adjusted under 35 U.S.C. 154(b) by 678 days.

(21) Appl. No.: 12/475,024

(22) Filed: May 29, 2009

(65) Prior Publication Data

US 2009/0296627 A1    Dec. 3, 2009

(30) Foreign Application Priority Data

May 29, 2008    (KR) ........................ 10-2008-0050222

(51) Int. Cl.
*G01R 31/08*    (2006.01)
*H04W 4/00*    (2009.01)

(52) U.S. Cl. .......................... 370/252; 370/328; 370/338
(58) Field of Classification Search .................. None
See application file for complete search history.

(56) References Cited

U.S. PATENT DOCUMENTS

| 7,813,695 | B2 * | 10/2010 | Haartsen ...................... 455/11.1 |
| 7,961,670 | B2 * | 6/2011 | Park et al. ..................... 370/328 |
| 7,970,344 | B2 * | 6/2011 | Horiuchi et al. ............. 455/11.1 |
| 2007/0160014 | A1 * | 7/2007 | Larsson ........................ 370/338 |
| 2009/0116419 | A1 * | 5/2009 | Chong et al. ................. 370/312 |
| 2010/0157826 | A1 * | 6/2010 | Yu et al. ........................ 370/252 |

* cited by examiner

*Primary Examiner* — Nittaya Juntima
(74) *Attorney, Agent, or Firm* — The Farrell Law Firm, P.C.

(57) ABSTRACT

Method and apparatus for selecting an RS mode in a BWA communication system are provided. In a method for a BS to select an RS mode in a BWA communication system, bidding prices are received from a set of RSs covered by the BS. The winner RS of at least one or more auctions is determined on the basis of the bidding values and the interference information of the RS set. The winner RS is set to operate in an active mode.

14 Claims, 13 Drawing Sheets

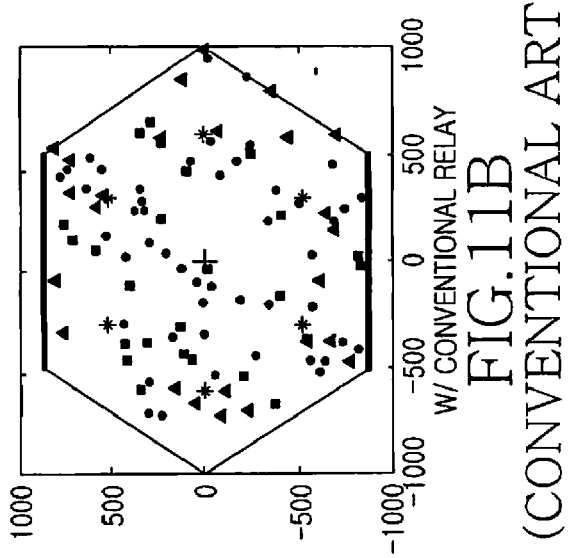
FIG.11A (CONVENTIONAL ART) NO RELAY
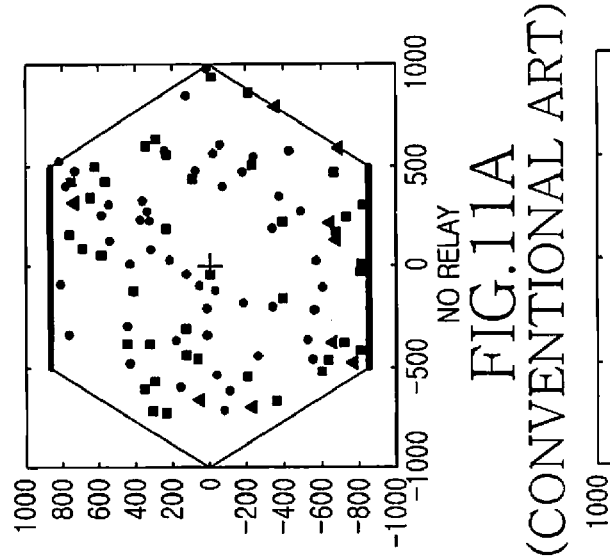
FIG.11B (CONVENTIONAL ART) W/ CONVENTIONAL RELAY
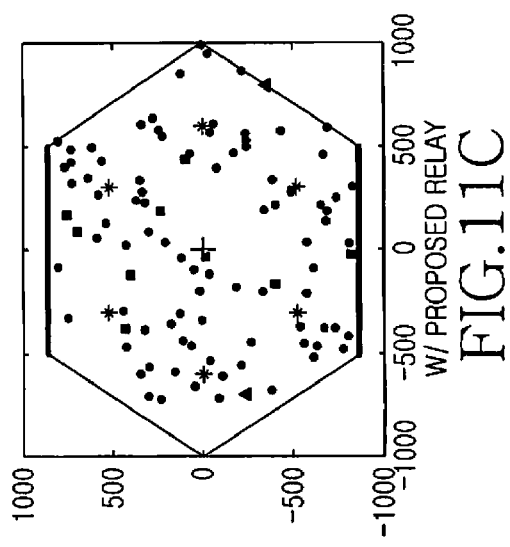
FIG.11C W/ PROPOSED RELAY

APPARATUS AND METHOD FOR SELECTING RELAY STATION MODE IN WIRELESS COMMUNICATION SYSTEM

PRIORITY

This application claims priority under 35 U.S.C. §119 to an application filed in the Korean Intellectual Property Office on May 29, 2008 and assigned Serial No. 10-2008-0050222, the contents of which are incorporated herein by reference.

BACKGROUND OF THE INVENTION

1. Field of the Invention

The present invention relates generally to an apparatus and method for a Base Station (BS) of a wireless communication system to perform an auction process on the basis of bidding prices presented by Relay Stations (RSs), to select one or more RSs to operate in an active mode.

2. Description of the Related Art

With the development of mobile communication systems, services essentially requiring communication environments of good quality are on the increase. To enable such services, research is being conducted to introduce the concept of intra-cell RSs.

In general, RSs are used to provide cell coverage improvement, Signal to Interference plus Noise Ratio (SINR) improvement, and inter-RS cooperative communication.

Such RSs are generally installed in intra-cell shadow areas or at cell boundaries to amplify/transmit or retransmit signals from BSs to user terminals (or Mobile Stations (MSs)) that are located in shadow areas incapable of receiving services from the BSs even with high power.

Even in the shadow areas wherein MSs are incapable of receiving good services from BSs, MSs can receive services through RSs capable of amplifying/transmitting signals between links, thereby improving the link qualities. Such RSs can be used for the next-generation mobile communication services (e.g., BWA communication services) that require the transmission of large amounts of data.

Institute of Electrical and Electronics Engineers (IEEE) 802.16j standard is being developed as the technical standard for the implementation of such RSs. The IEEE 802.16j standard specifies a sleep mode of an RS. This deactivates the RS in the case where there is no MS to serve, thereby enabling the RS to automatically turn on/off its own transmit/receive (TX/RX) power in such a case. However, the IEEE 802.16j standard does not specify which MSs will be served by the RS, that is, a collection of target MSs of the RS.

The RS may select some of MSs in its coverage area. In this case, if the selected MSs have relatively poor channel conditions, setting all the selected MSs to communicate through the RS may cause problems.

Also, because the next-generation mobile communication services may have diverse Quality-of-Service (QoS) requirements, setting communication links without taking into consideration such diverse QoS requirements may reduce the QoS satisfaction levels.

If there is an MS communicating with a BS at a low RX data rate with a small delay, the MS may or may not be satisfied with the quality of a link with the BS, depending on its current service type.

There is no method for a conventional RS to select MSs. If such a conventional RS is configured to set an MS to communicate through the conventional RS, without knowing whether the MS is satisfied with the QoS, the use of the conventional RS may reduce the QoS satisfaction level of the user, contrary to expectation.

If possible, it is recommended that all the intra-cell areas should become Line-Of-Sight (LOS) environments in the next-generation communication environments requiring higher-quality channel conditions. Thus, it is required that RSs are installed throughout the cells.

However, if many RSs operate in the neighborhood of the boundary of a cell and thus increase the power in the neighborhood of an adjacent cell, this increases the interference with the adjacent cell (in comparison with the case of using only BSs for communication services), thus reducing the QoS satisfaction levels of the users in the adjacent cell.

SUMMARY OF THE INVENTION

The present invention has been made to address at least above the problems and/or disadvantages and to provide at least the advantages described below.

An object of the present invention is to substantially address at least the above problems and/or disadvantages described above and to provide at least the advantages set forth below. Accordingly, an object of the present invention is to provide an apparatus and method for selecting an RS mode in a BWA communication system.

Another object of the present invention is to provide an apparatus and method for an RS of a BWA communication system to actively collect MSs to use the RS, according to user QoS requirements, by sensing the states of MSs adjacent to the RS.

Another object of the present invention is to provide an apparatus and method for a BWA communication system. Herein, an RS determines the QoS satisfaction levels of MSs to collect MSs to user the RS, so that the users can select links most suitable for their QoS requirements. A BS selects a set of RSs that can provide the greatest improvement effects and minimize the interference with an adjacent cell when operating as intra-cell RSs.

According to an embodiment of the present invention, a method for a BS to select an RS mode in a BWA communication system includes receiving bidding prices from a set of RSs covered by the BS; determining the winner RS of at least one or more auctions on the basis of the bidding values and the interference information of the RS set; and setting the winner RS to operate in an active mode.

According to another embodiment of the present invention, a method for operating an RS in a BWA communication system includes selecting at least one user to be served by the RS; and determining a bidding price on the basis of the performance improvement information of the selected user and transmitting the determined bidding price to a BS.

According to another embodiment of the present invention, an apparatus of a BS for selecting an RS mode in a BWA communication system includes a receiver unit receiving bidding prices from a set of RSs covered by the BS; and a controller unit determining the winner RS of at least one or more auctions on the basis of the bidding values and the interference information of the RS set, and setting the winner RS to operate in an active mode.

According to another embodiment of the present invention, an apparatus of an RS in a BWA communication system includes a communication modem communicating with another node; and a controller unit selecting at least one user to be served by the RS, determining a bidding price on the basis of the performance improvement information of the selected user, and transmitting the determined bidding price through the communication modem to a BS.

BRIEF DESCRIPTION OF THE DRAWINGS

The above and other objects, features and advantages of the present invention will become more apparent from the following detailed description when taken in conjunction with the accompanying drawings in which:

FIG. 11A is a diagram illustrating user QoS satisfaction rates with no RS;

FIG. 11B is a diagram illustrating user QoS satisfaction rates with a conventional RS;

FIG. 11C is a diagram illustrating user QoS satisfaction rates with a proposed RS according to an embodiment of the present invention;

DETAILED DESCRIPTION OF THE PREFERRED EMBODIMENTS

Preferred embodiments of the present invention will be described herein below with reference to the accompanying drawings. In the following description, detailed descriptions of well-known functions or constructions will be omitted since they would obscure the invention in unnecessary detail. Also, the terms used herein are defined according to the functions of the present invention.

The present invention provides an apparatus and method for RS mode conversion in a BWA communication system.

According to the present invention, a BS selects one of several RSs through an auction process, which most improves a service for a user to maximize QoS satisfaction levels.

An embodiment of the present invention verifies QoS satisfaction levels according to user QoS requirements. Types of services according to user QoS requirements are assumed prior to estimation of QoS satisfaction levels.

Examples of the service types are a service type requiring a relatively small delay time and a relatively low data rate, a service type requiring a relatively large delay time and a relatively high data rate, and a service type requiring a relatively small delay time and a relatively high data rate.

An embodiment of the present invention verifies the differences in data rate and delay time depending on the percentages of the service types in a cell.

In the present invention, it is assumed that a frequency reuse factor is 1. Through information exchange with an adjacent cell, a BS is aware of a frequency band that is undergoing a severe interference in the adjacent cell.

Figure 1A:
FIG. 1A is a diagram illustrating an interference subcarrier band reported from an adjacent cell to a BS according to an embodiment of the present invention.

FIG. 1A is a diagram illustrating an interference subcarrier band reported from an adjacent cell to a BS according to an embodiment of the present invention;

Referring to FIG. 1A, through information exchange with BSs in an adjacent cell, a BS can detect subcarrier bands S1, S2, S4, S10 and S15 among subcarrier bands of the adjacent cell, the current interferences of which are greater than a threshold value.

Figure 1B:
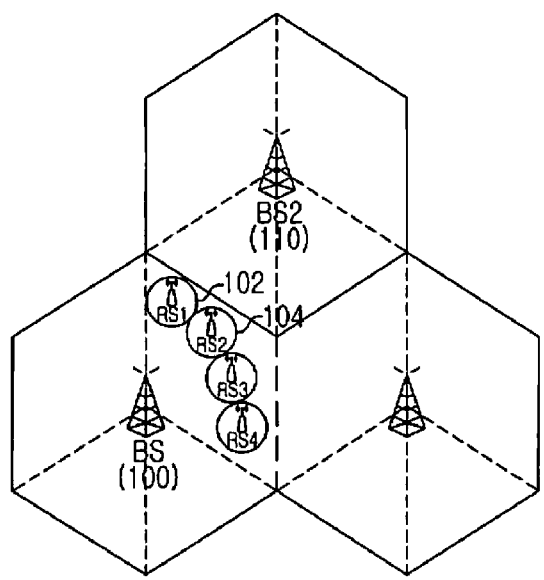
FIG. 1B is a diagram illustrating RSs affecting an adjacent BS according to an embodiment of the present invention.

FIG. 1B is a diagram illustrating RSs affecting an adjacent BS according to an embodiment of the present invention.

Referring to FIG. 1B, an RS1 102 and an RS2 104 affect a BS2 110. As in FIG. 1A, subcarrier bands S1, S2, S4, S10 and S15 among the subcarrier bands of the BS2 110 are reported to have severe interference.

$$S_{BS,BS_2} = \{S_1, S_2, S_4, S_{10}, S_{15}\}$$

$$BS_2 = \{RS_1, RS_2\} \quad (1)$$

Equation (1) expresses the state of FIG. 1B. Equation (1) expresses subcarrier bands among the subcarrier bands of a BS 100, where the adjacent BS2 110 undergoes an interference greater than a threshold value. $S_i$ denotes the $i^{th}$ subcarrier band. Also, $BS_2 = \{\ \}$ denotes RSs affecting the BS2 110, among the RSs located in the BS 100.

The BS 100 determines that an MS having a channel modulation rate greater than a threshold value, among MSs served by the BS 100, does not need to communicate through an RS. The BS 100 notifies an identification number of the MS to the RS so that the RS will not connect to the MS unnecessarily.

According to the present invention, an intra-cell RS detects QoS-unsatisfied users through spectrum sensing to generate a set of RS users.

An RS operates in a standby mode or an active mode in accordance with the designation of a BS, and the BS determines which of the RSs in its cell is to operate in an active mode. This activates an RS selectively through an auction process, thereby making it possible to minimize an interference that is caused when the RS operates in the neighborhood of an adjacent cell.

A method for operating an RS by mode conversion is described below.

According to the present invention, an RS operates in two modes: an active mode and a standby mode. The standby mode can be compared with a state where a conventional sleep-mode RS is fully deactivated so that it does not transmit its power.

A standby-mode RS does not communicate user traffic, but can sense a change in the control power of an MS and exchange control information with a BS. A standby-mode RS sensing the power changes of adjacent MSs detects the MS with a control power change greater than a threshold value, and reserves to itself the detected MS to be served by the standby-mode RS.

Figure 2:
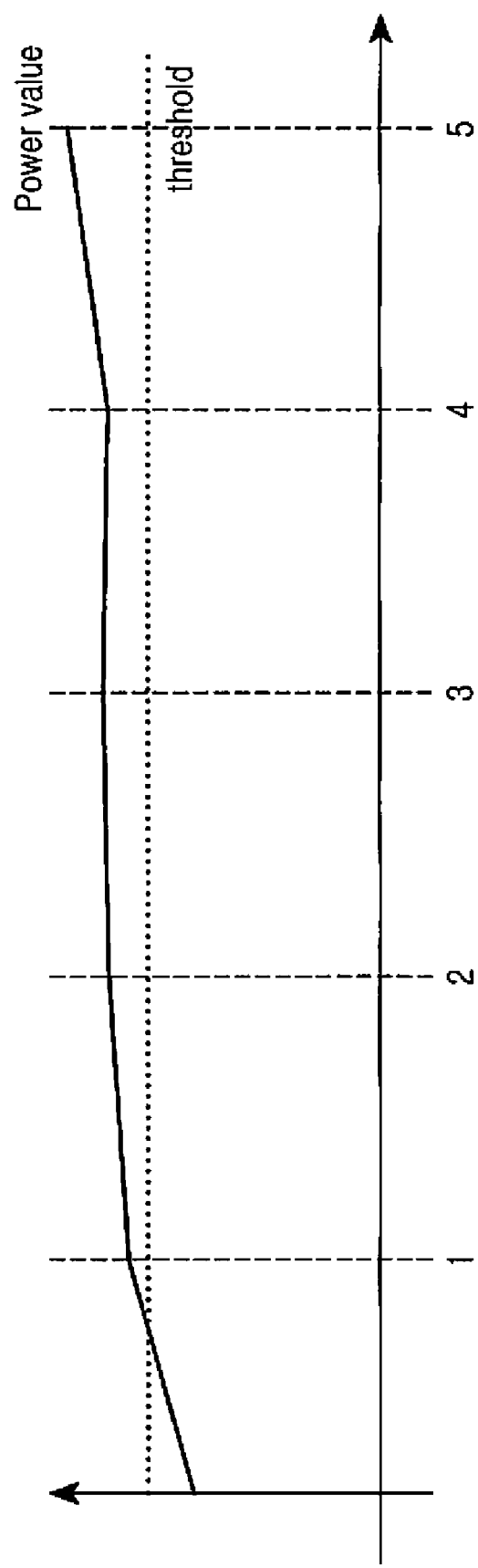
FIG. 2 is a diagram illustrating a control power change detected by an MS according to an embodiment of the present invention.

However, if the control power of an MS continues to maintain a high value as illustrated in FIG. 2, the MS is also reserved as a user of the RS although there is no change in its power.

A state where intra-cell RSs receive traffic from MSs is defined as an active mode.

The conversion between an active mode and a standby mode is determined by the BS.

When converted to an active mode, the RS transmits to the BS a change in the QoS satisfaction level of an MS, which is expected to be improved. In consideration of the improvement values presented by all the intra-cell RSs and the level of an interference with an adjacent cell to be caused by the RS, the BS determines a set of RSs to be most gainful among several RSs in terms of improvement value and interference level, and operates the RS set accordingly.

Practically, a state where a service is provided to an MS by order of the BS is designated as an active mode.

Unlike the conventional art, the present invention selectively provides a service to an MS essentially requiring a connection with an RS, thereby making it possible to improve the user QoS satisfaction level. Also, according to the interference conditions of an adjacent cell, the present invention selects an RS to operate, thereby making it possible for the RS to operate more efficiently.

A method for selecting MSs to use an RS is described below.

According to the present invention, in order to selectively provide a service to only users unsatisfied with the communication condition with the BS, the RS detects a power change range of each MS and detects whether each MS is satisfied with the QoS. Thereafter, the RS estimates a Signal to Noise Ratio (SNR) of an MS-RS link to determine an MS expected to have a high SNR. As the MS is less satisfied with its channel condition, the MS transmits higher control power to the BS. The RS is sensing such a control power change of an MS in a standby mode. When the sensed control power change is greater than a threshold value, the RS determines the MS to be managed by the RS itself.

The threshold value is related to the level of an interference undergone by an adjacent cell, which is detected by the BS. If the power change range of an MS, which is previously notified by the BS as having good channel conditions, is sensed by the RS, the MS is not designated as an RS user.

$$N[S_{BS,BS_i}] \notin \gamma_j \quad (2)$$

Equation (2) expresses a criterion for determining a threshold value $\gamma_j$ of a power change of the $j^{th}$ RS. The threshold value $\gamma_j$ is inversely proportional to the number of subcarrier bands, reported by the adjacent $i^{th}$ BS as having severe interference, which is detected by the BS.

When the RS serves many MSs in a cell boundary region while operating in an active mode, the power used by the RS increases. This further increases the level of an interference with an adjacent cell, and reduces the QoS satisfaction levels of users of an adjacent cell served by a subcarrier band with a severe interference. Therefore, if the interference condition of an adjacent cell is poor, the RS must increase the threshold value so as not to sense an MS unless the MS shows a very great power change.

When sensing a power change of an MS, the RS must be able to discriminate between an MS having a high TX power due to a high data rate from an MS having a high RX power due to a poor channel condition. To this end, the quotient of dividing the TX power by the distance to an MS is defined as the power change value detected by the RS. Also, it is determined that only an MS having the best bandwidth efficiency in a link with the RS can be served by the RS.

$$U_{j,k} = \begin{cases} 1 & \text{if } \delta_{p,k} \text{ and } \delta_{m,k} = 1 \\ 0 & \text{otherwise} \end{cases} \quad (3)$$

$$\delta_{p,k} = \begin{cases} 1 & \text{if } P_k/D_k < \gamma_j \\ 0 & \text{otherwise} \end{cases}$$

$$\delta_m = \begin{cases} 1 M_{j,k} \geq 6 \\ 0 & \text{otherwise} \end{cases}$$

Equation (3) explicitly expresses the condition where the RS senses (or selects) one or more MSs. Herein, $\delta_{p,k}$ and $\delta_{m,k}$ respectively denote power and an assignment indicator of a modulation level. $\delta_{p,k}$ is 1 if the quotient of dividing the TX power $P_k$ of the $k^{th}$ MS by the distance $D_k$ between the $k^{th}$ MS and the BS is less than a threshold value. Also, $\delta_{m,k}$ is 1 if the modulation rate of a channel estimated by the RS in consideration of the distance to an MS is greater than 6. That is, an MS, which is unsatisfied with the QoS in service with the BS to thus communicate with increased power and is expected to be provided a greatly improved performance when communicating through an RS, is determined to use the RS. Herein, $U_k$ denotes a selected user or MS.

According to the present invention, only users unsatisfied with the QoS requirements are selectively sensed and only a user expected to be provided a greatly improved performance communicates through the RS, thus making it possible to efficiently satisfy the users' requirements.

A method for selecting a set of active-mode RSs based on an auction is described below.

According to the present invention, an RS determines the possible improvement level of the QoS requirement of a user sensed by the RS itself, and a BS determines which RS it will activate. An RS, which sensed a user, detects the current subcarrier band of the sensed user through a spectrum sensing process.

According to the present invention, an RS is assigned a subcarrier band sensed by the RS itself. Detecting a subcarrier band used by an MS sensed by an RS makes it possible to detect the total subcarrier band assigned to the RS.

If an RS operates in an active mode by using a subcarrier band to be assigned to the RS itself, it reserves subcarriers to be redistributed in order to provide a transmission suitable for a service for an MS.

Figure 3:
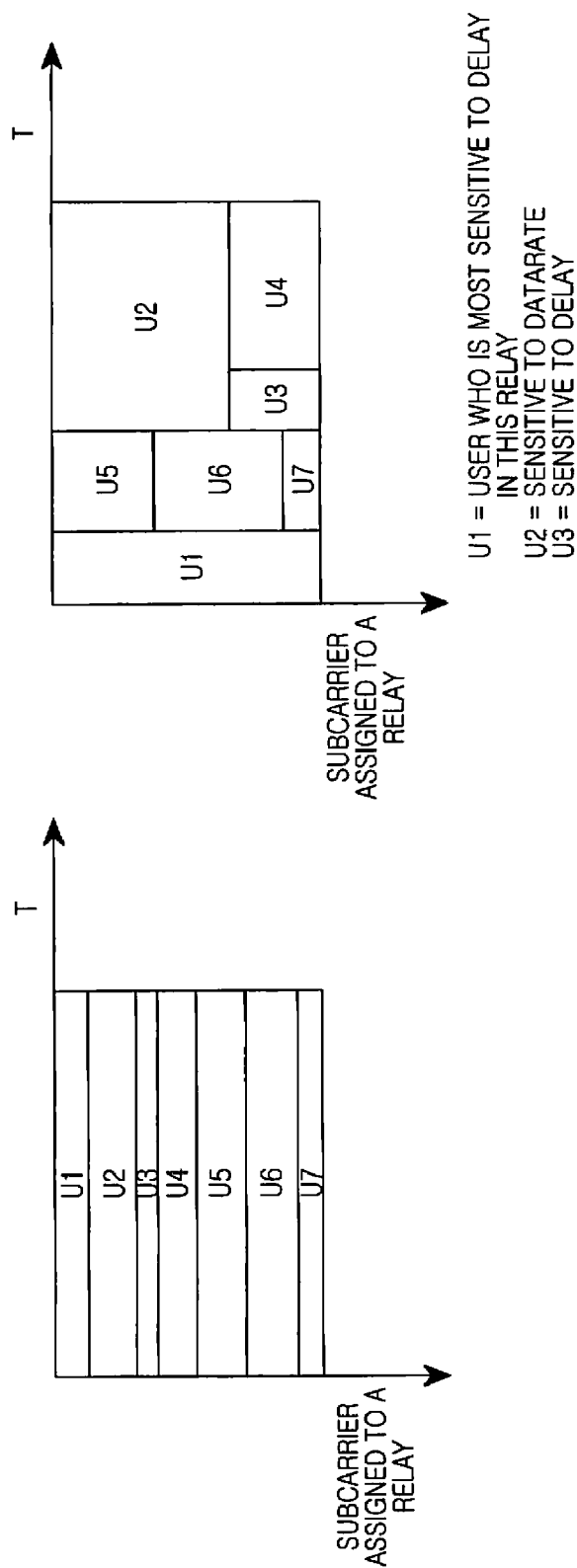
FIG. 3A is a diagram illustrating a subcarrier distribution process to a conventional RS.
FIG. 3B is a diagram illustrating a subcarrier distribution process to a proposed RS according to an embodiment of the present invention.

As illustrated in FIG. 3A, the amount of information transmitted to a specific user at each point in one time slot was uniform in the conventional art. The present invention redistributes the total subcarrier band in accordance with the QoS requirements as illustrated in FIG. 3B.

A user more sensitive to a delay has the higher priority for subcarriers within one time slot, and the number of subcarriers is distributed in consideration of the information amount of each user in accordance with the assignment sequence.

The form of a subcarrier occupied by each RS after subcarrier redistribution is illustrated in FIG. 3B. Because U1 is sensitive to both the data rate and the delay time, all the assigned subcarriers are assigned to U1 for a predetermined time to minimize the delay.

A user, which is less sensitive to the delay time and thus has the lower priority for subcarriers, will fail to be assigned a subcarrier due to lack of subcarriers. In order to prevent this case, the rate of a subcarrier band assigned to each user is set to be less than the ratio of the band occupied by each user for communication with the BS to the total subcarrier band of the BS.

$$R_{k,j} = \text{Sub\_BW} \cdot n_k \cdot \sum_{n_k} m_{n_k} \quad (4)$$

Equation (4) expresses the data rate of the $k^{th}$ user expected after subcarrier redistribution by the $j^{th}$ RS. This value is presented as one of the bidding prices in the subsequent auction process. Sub_BW denotes a sub-bandwidth, $n_k$ denotes the number of distributed subcarriers, and $m_{n_k}$ denotes a bandwidth efficiency.

After the subcarrier redistribution, an RS may determine the improvement level of a service for an MS selected by the RS itself. The RS is aware of the type of a current service for an MS through information exchange with the MS.

TABLE 1

|  | Voice | Interactive | Web browsing | Real-time video streaming |
| --- | --- | --- | --- | --- |
| Allowed delay | <400 msec | <150 msec | 4 sec/page | <10 sec |
| Required data rate | 9.8 kbps | 78 kbps | 384 kbps~1 Mbps | 2 Mbps |

Table 1 above shows exemplary reference values of a delay time and a data rate required for each service. The difference between a reference value corresponding to each service of a user and a numerical value expected to be improved by an RS after subcarrier redistribution is a bidding price presented by the RS.

$$\delta_{delay,k} = \frac{1}{T_{k,j} - T_{allowed}} \quad (5)$$

$$\delta_{data,k} = \frac{1}{R_{allowed} - R_{k,j}}$$

if $T_{k,j} - T_{allowed}$ or $R_{allowed} - R_{k,j} \le 0$, $\delta_{delay,k} = \alpha$, $\delta_{data,k} = \beta$ $$\Gamma_j = \sum_{k=1}^{Num\_u_j} (A \cdot \delta_{delay,k}(1+X_k) + B \cdot \delta_{data,k}(1+Y_k))$$

Equation (5) expresses a process of determining the bidding value $\Gamma_j$ of the $j^{th}$ RS. $R_{k,j}$ denotes the data rate of the $k^{th}$ user expected after subcarrier redistribution by the $j^{th}$ RS. $T_{k,j}$ denotes the delay time of the $k^{th}$ user expected after subcarrier redistribution by the $j^{th}$ RS. The delay time improvement amount $\delta_{delay,k}$ is defined by the improvement value expected after subcarrier redistribution, and the data rate improvement amount $\delta_{data,k}$ is defined by the difference between the delay value and the data rate value required for each service specified in Table 1. If the improvement amount is greater than the requirement amount, the maximum value of the bidding value is determined by Equation (5). If there is an improvement in a more sensitive QoS item for each service for each user, a weighting factor (X, Y) may be set to give a greater weight to the QoS item. A and B are adjustment constants for balancing the bidding value of each item. Upon receiving the bidding prices from all the intra-cell RSs, the BS determines the winner of the final auction in consideration of the interference conditions.

$$\{\Gamma_1, \Gamma_2\} = \{10, 2\} \quad (6)$$

$$W_1 = \begin{cases} 1 & \text{if } N[S_{BS,BS_2} \cap S_{RS_1}] \le \sigma \\ 0 & \text{otherwise} \end{cases}$$

if $W_1 = 1$, $$W_2 = \begin{cases} 1 & \text{if } N[S_{BS,BS_2} \cap S_{RS_2}] \le \sigma - N[S_{BS,BS_2} \cap S_{RS_1}] \\ 0 & \text{otherwise} \end{cases}$$

Equation (6) expresses a process of determining the winner of an auction by the BS.

Figure 1C:
FIG. 1C is a diagram illustrating subcarrier bands needing to be assigned respectively to an RS1 and an RS2 according to an embodiment of the present invention.

Referring to FIG. 1B, RS1 102 and RS2 104 affects BS2 110. It is assumed that one of the two RSs presenting the highest bidding price to BS 100 is RS 1102 (because the biding price of the RS1 102 is 10 and the bidding price of RS2 104 is 2). Subcarrier bands needing to be assigned respectively to RS1 102 and RS2 104 according to an embodiment are illustrated in FIG. 1C. Among the subcarrier bands, if there are bands S1 and S10 the overlap with the band reported by BS2 110 in FIG. 1A, it is allowed that only a subcarrier band less than a threshold value is assigned in an overlapping manner. Herein, $W_j$ denotes an indicator of an auction winner RS.

In Equation (6), RS1 102 may be determined to be the winner $W_1$ of an auction, if the number of intersections between the subcarrier band $S_{BS,BS_2}$ reported from BS2 110 and the subcarrier band $S_{RS_2}$ to be assigned to RS 1102 is less than a threshold value $\delta$. In Equation (6), if RS1 102 becomes the winner of the auction to operate in an active move and its bands overlap with the band with the severest interference of an adjacent cell (e.g., BS2 110) as many as $N[S_{BS,BS_2} \cap S_{RS_1}]$, a threshold value for allowing an overlap of subcarrier bands between RS2 104 and BS2 110 decreases by $\sigma - N[S_{BS,BS_2} \cap S_{RS_1}]$.

Thereafter, RS2 104 may be determined to be the winner $W_2$ of an auction, if the number of intersections between the subcarrier band $S_{BS,BS_2}$ reported from BS2 110 and the subcarrier band $S_{RS_2}$ to be assigned to RS2 104 is less than a threshold value.

The present invention selects an RS to operate in an active mode through an auction process, thereby making it possible to maximize the user QoS satisfaction level and minimize the interference with an adjacent cell.

A method for converting an RS to a standby mode is described below.

The present invention comprises an operation scheme for converting the active-mode RS to the standby-mode RS. The active-mode RS converts to a standby mode in the following three cases.

The first case is where the RS is not the winner of the next auction.

The second case is where the interference in an adjacent cell caused by the subcarrier band of the active-mode RS is greater than a threshold value. In this case, the BS interrupts the connection of an MS with an RS, which occupies a new subcarrier band reported from the RS, so that the MS resumes communication with the BS.

Figure 4:
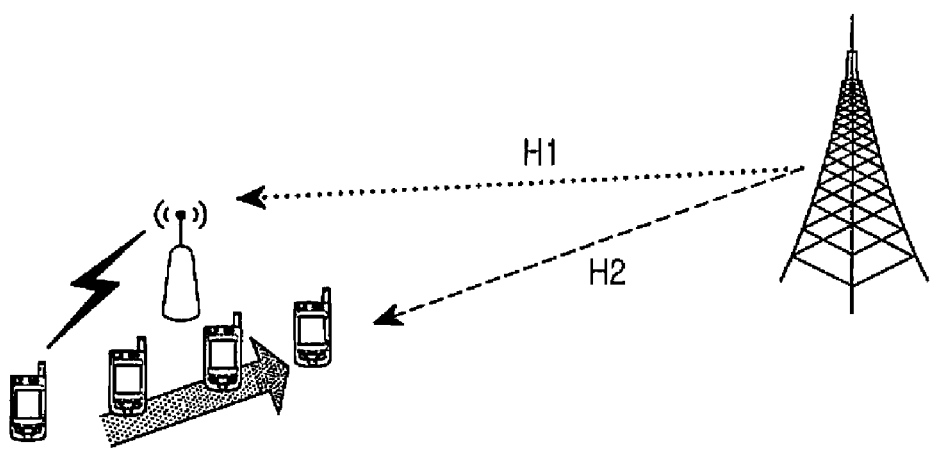
FIG. 4 is a diagram illustrating the case of conversion to a standby mode according to an embodiment of the present invention.

In the third case, as illustrated in FIG. 4, when the BS compares all the channel conditions, if an MS moves from an initial power sensing place and thus communication with the BS becomes more advantageous (H1→H2), the MS interrupts a channel with an RS and communicates directly with the BS. If the number of MSs served by the RS is less than a threshold value, the active-mode RS converts to a standby mode. The determination in the above process is performed by the BS.

Figure 5:
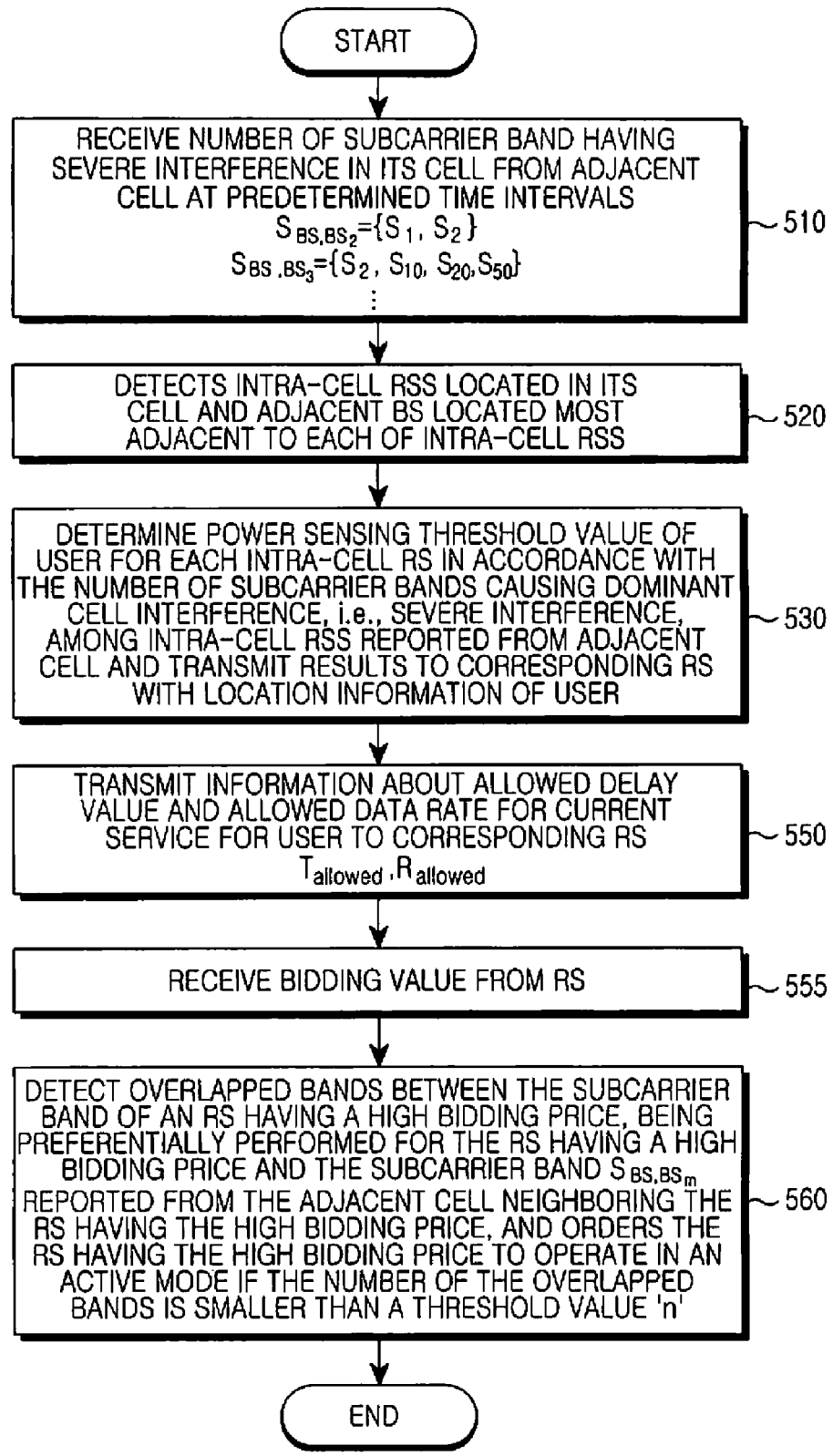
FIG. 5 is a flow chart illustrating an operational process of a BS communicating with a standby-mode RS according to an embodiment of the present invention.

FIG. 5 is a flow chart illustrating an operational process of a BS communicating with a standby-mode RS according to an embodiment of the present invention.

Referring to FIG. 5, in step 510, the BS receives a number of a subcarrier band having a severe interference in its cell from an adjacent cell at predetermined time intervals or cycles. For example, it may be reported that a BS2 severely interferes with bands $S_1$ and $S_2$, or that a BS3 severely interferes with bands $S_2$, $S_{10}$, $S_{20}$ and $S_{50}$. In step 520, the BS detects intra-cell RSs located in its cell and an adjacent BS located most adjacent to each of the intra-cell RSs. In step 530, the BS determines a power sensing threshold value of a user for each intra-cell RS in accordance with the number of subcarrier bands causing a dominant cell interference (i.e., a severe interference), among the intra-cell RSs reported from an adjacent cell, and transmits the value to the corresponding intra-cell RS with location information of the user. In step 550, the BS transmits to the corresponding RS information about an allowed delay value and an allowed data rate for the current service for the user. In step 555, the BS receives bidding prices from RSs. In step 560, the BS detects overlapped bands between the subcarrier band of an RS having a high bidding price, being preferentially performed for the RS having a high bidding price and the subcarrier band $S_{BS, BSm}$ reported from the adjacent cell neighboring the RS having the high bidding price, and orders the RS having the high bidding price to operate in an active mode if the number of the overlapped bands is less than a threshold value 'n', determined by using Equation (6).

Thereafter, the BS ends the operational process.

Figure 6:
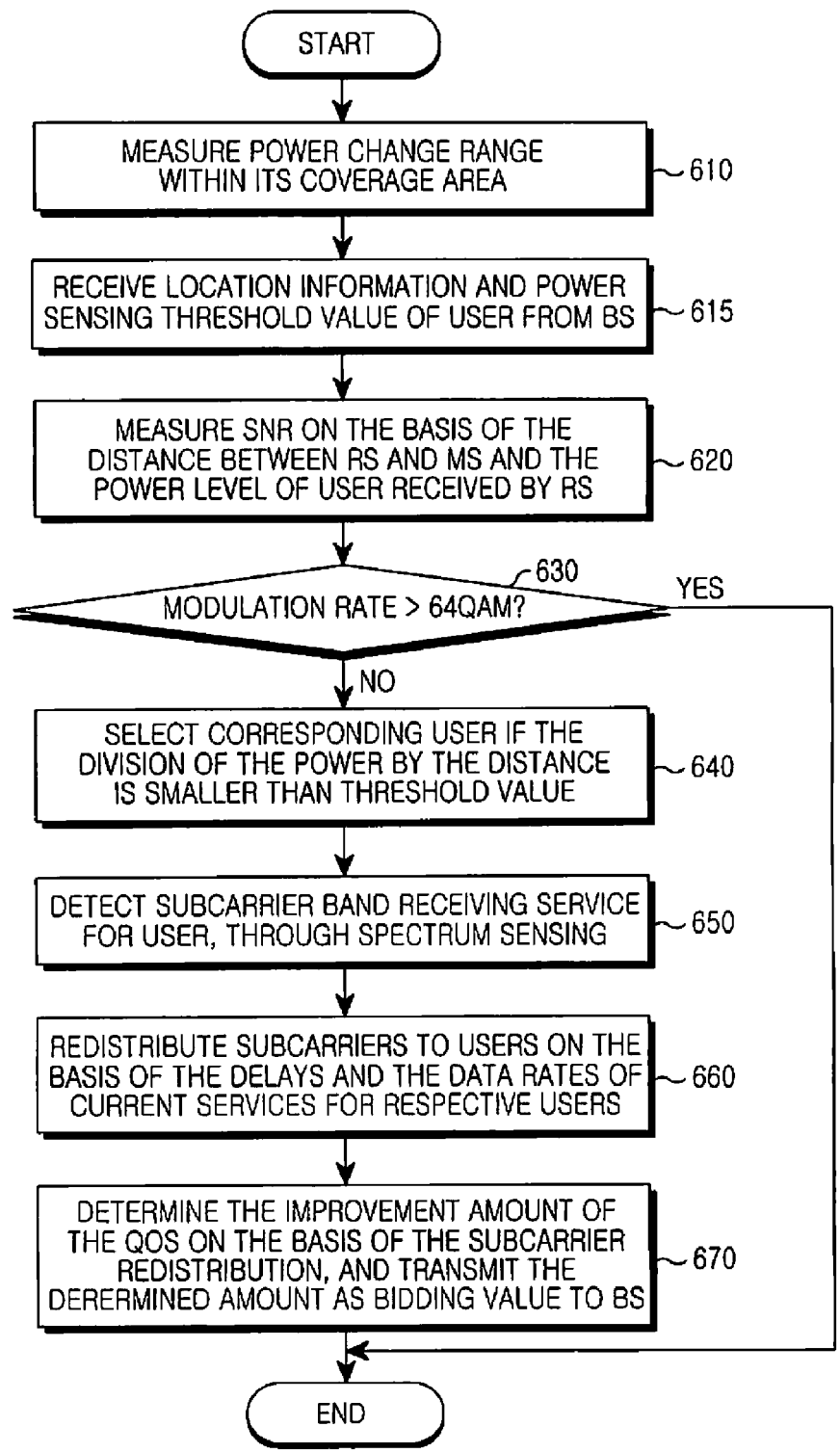
FIG. 6 is a flow chart illustrating an operational process of a standby-mode RS according to an embodiment of the present invention.

FIG. 6 is a flow chart illustrating an operational process of a standby-mode RS according to an embodiment of the present invention.

Referring to FIG. 6, in step 610, the RS measures a power change range of an MS within its coverage area. In step 615, the RS receives the location information and the power sensing threshold value of the user from a BS. In step 620, the RS measures an SNR on the basis of the distance between the RS and the MS (user) and the power level of the user received by the RS. In step 630, the RS measures a modulation rate of the user and determines whether the modulation rate is greater than a threshold value (e.g., 64QAM). If the modulation rate is greater than the threshold value in step 630, the operational process is ended and the corresponding user is served by the BS. If the modulation rate is less than the threshold value in step 630, the operational process proceeds to step 640. In step 640, the RS selects the corresponding user if the quotient of dividing the power by the distance is less than a threshold value. In step 650, through spectrum sensing, the RS detects a subcarrier band receiving a service for the user. In step 660, the RS redistributes subcarriers to users on the basis of the delays and the data rates of the current services for the respective users. In step 670, the RS determines the improvement amount of the QoS on the basis of the subcarrier redistribution, and transmits the determined amount as a bidding value to the BS.

Thereafter, the RS ends the operational process.

Figure 7:
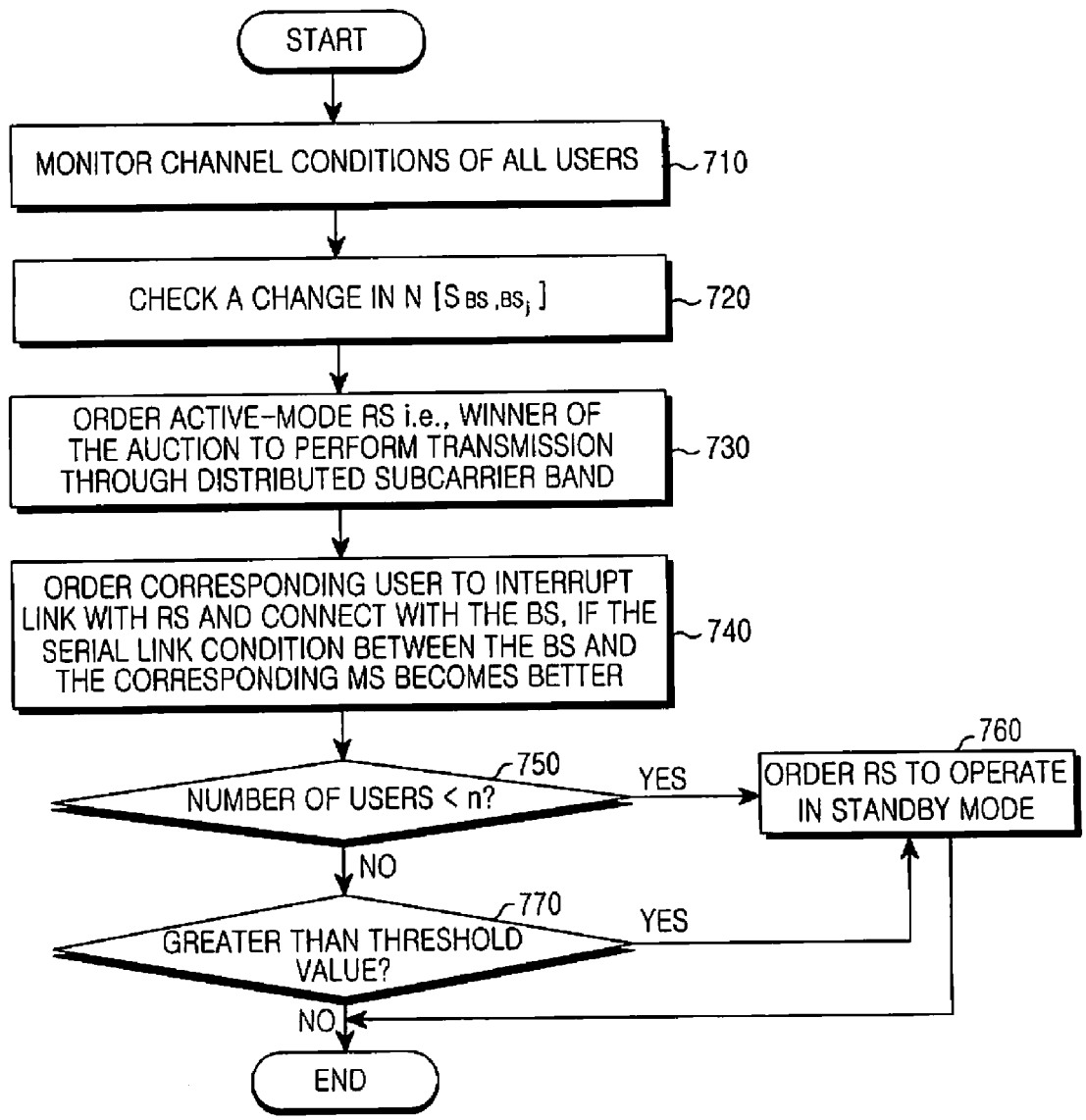
FIG. 7 is a flow chart illustrating an operational process of a BS communicating with an active-mode RS according to an embodiment of the present invention.

FIG. 7 is a flow chart illustrating an operational process of a BS communicating with an active-mode RS according to an embodiment of the present invention.

Referring to FIG. 7, in step 710, the BS monitors the channel conditions of all the users. In step 720, the BS determines a bandwidth change $N[S_{BS, BSj}]$. In step 730, the BS performs an auction, and orders the active-mode RS (i.e., the winner of the auction) to perform transmission through the distributed subcarrier band. In step 740, if there is an increased in the serial link condition between the BS and the corresponding MS, the BS orders the corresponding user to interrupt a link with the RS and connect with the BS. That is, it orders the BS to serve the corresponding MS. In step 750, the BS determines whether the number of MSs using the RS is less than a threshold value 'n'. If the number of the MSs is less than the threshold value 'n' in step 750, the operational process proceeds to step 760. In step 760, the BS sets the RS to operate in a standby mode. If the number of the MSs is not less than the threshold value 'n' in step 750, the operational process proceeds to step 770. In step S770, the BS determines whether the interference caused by the RS is greater than a threshold value. If the interference is greater than the threshold value in step 770, the operational process proceeds to step 760.

Thereafter, the BS ends the operational process.

Figure 8:
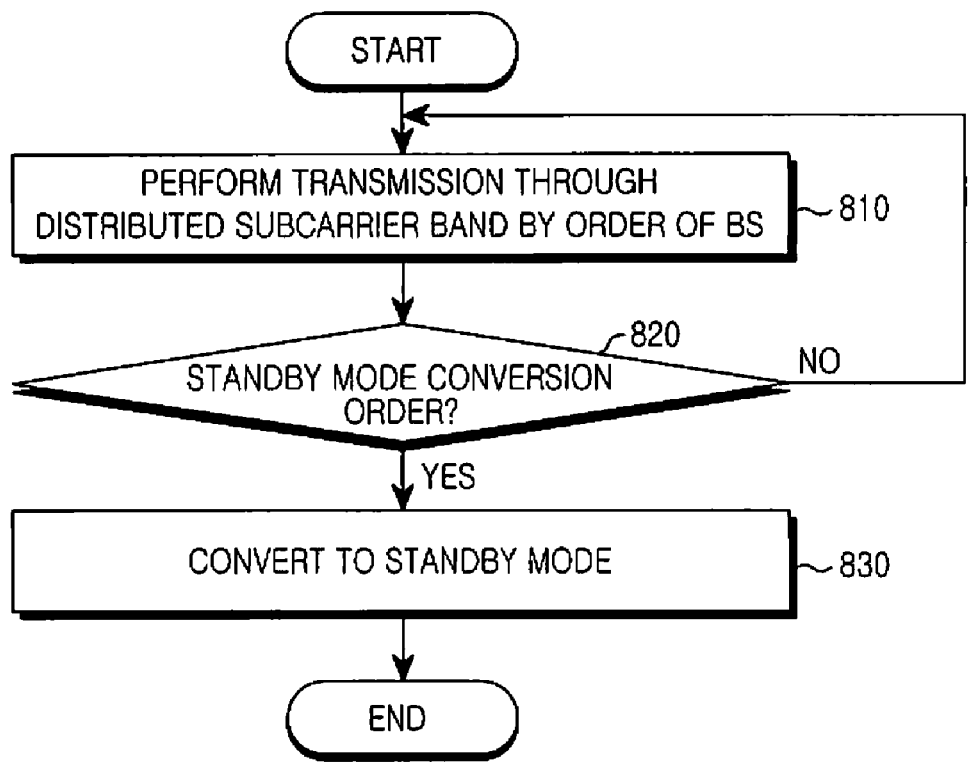
FIG. 8 is a flow chart illustrating an operational process of an active-mode RS according to an embodiment of the present invention.

FIG. 8 is a flow chart illustrating an operational process of an active-mode RS according to an embodiment of the present invention.

Referring to FIG. 8, in step 810, the RS performs communication through the distributed subcarrier band by order of the BS. In step 820, the RS determines whether it has received a standby mode conversion order from the BS. If the standby mode conversation order is received from the BS, the operational process proceeds to step 830. In step 830, the RS converts to a standby mode.

Thereafter, the RS ends the operational process.

Figure 9A:
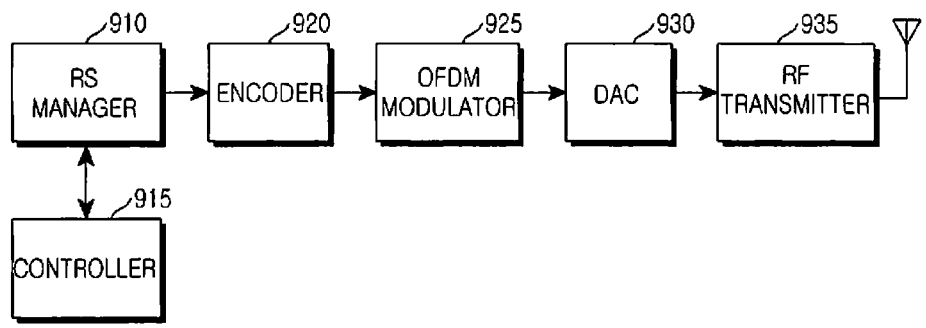
FIG. 9A is a block diagram of a transmitter of the BS according to an embodiment of the present invention.
Figure 9B:
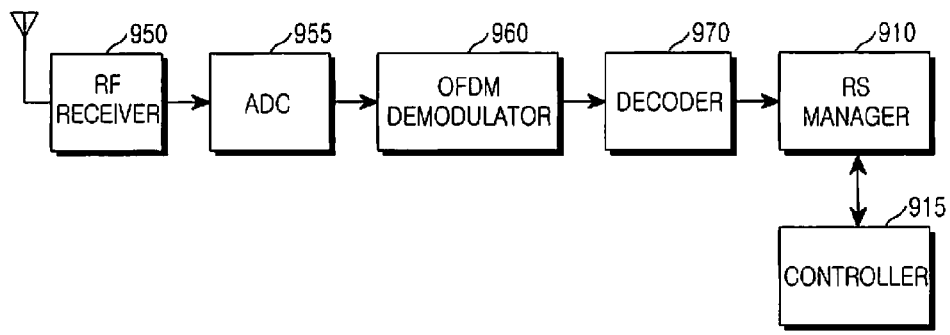
FIG. 9B is a block diagram of a receiver of the BS according to an embodiment of the present invention.

FIGS. 9A and 9B are block diagrams of a BS according to an embodiment of the present invention.

FIG. 9A is a block diagram of a transmitter of the BS according to an embodiment of the present invention. Referring to FIG. 9A, the transmitter of the BS comprises an RS manager 910, a controller 915, an encoder 920, an Orthogonal Frequency Division Multiplexing (OFDM) modulator 925, a Digital-to-Analog Converter (DAC) 930, and a Radio Frequency (RF) transmitter 935. Under the control of the controller 915, the RS manager 910 performs the operations of the BS illustrated in FIGS. 5 and 7. The controller 915 controls an overall operation of the BS. Particularly, the controller 915 controls the RS manager 910. The encoder 920 encodes and modulates data from the RS manager 910 in accordance with a predetermined Modulation and Coding Scheme (MCS) level. The OFDM modulator 925 Inverse Fast Fourier Transform (IFFT)-processes data from the encoder 920 to output sample data (OFDM symbols). The DAC 930 converts the sample data into an analog signal. The RF transmitter 935 converts the analog signal received from the DAC 930 into an RF signal and transmits the RF signal through an antenna.

FIG. 9B is a block diagram of a receiver of the BS according to an embodiment of the present invention.

Referring to FIG. 9B, the receiver of the BS comprises an RF receiver 950, an Analog-to-Digital Converter (ADC) 955, an OFDM demodulator 960, a decoder 970, an RS manager 910, and a controller 915. The RF receiver 950 receives an RF signal through an antenna and converts the RF signal into a baseband analog signal. The ADC 955 converts the analog signal received from the RF receiver 950 into sample data. The OFDM demodulator 960 Fast Fourier Transform (FFT)-processes the sample data received from the ADC 955 to output frequency-domain data. The decoder 970 selects desired data (burst data) from the frequency-domain data received from the OFDM demodulator 960, and demodulates and decode the selected data in accordance with a predetermined MCS level. Under the control of the controller 915, the RS manager 910 performs the operations of the BS illustrated in FIGS. 5 and 7. The functions of the controller 915 and the RS manager 910 of FIG. 9B are identical to those of FIG. 9A.

In the above configurations, the controller 915 may be configured to also perform the functions of the other units including the RS manager 910. Although separate units are provided for the respective functions of the controller 915, the controller 915 may be configured to perform all or some of the functions on behalf of such separate units.

Figure 10A:
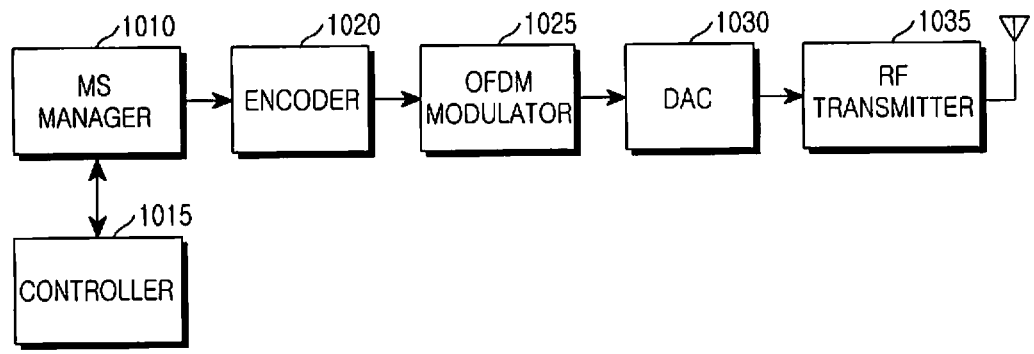
FIG. 10A is a block diagram of a transmitter of the RS according to an embodiment of the present invention.
Figure 10B:
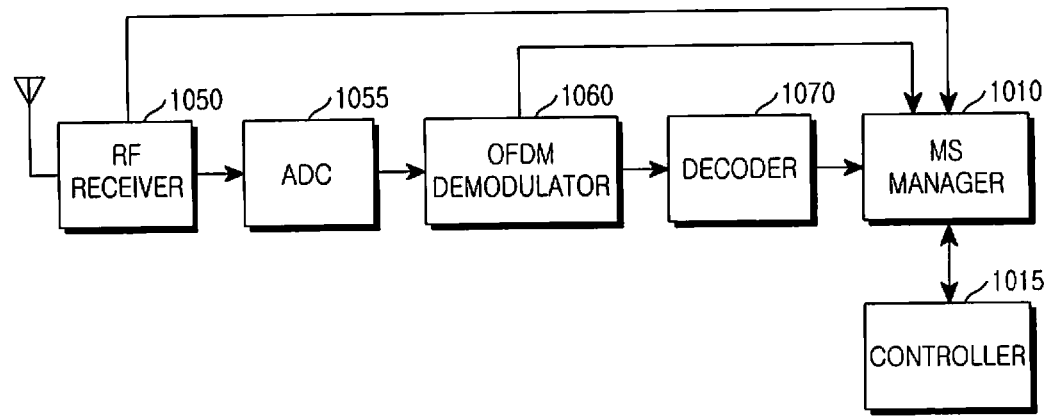
FIG. 10B is a block diagram of a receiver of the RS according to an embodiment of the present invention.

FIGS. 10A and 10B are block diagrams of an RS according to an embodiment of the present invention.

FIG. 10A is a block diagram of a transmitter of the RS according to an embodiment of the present invention. Referring to FIG. 10A, the transmitter of the RS comprises an MS manager 1010, a controller 1015, an encoder 1020, an OFDM modulator 1025, a DAC 1030, and an RF transmitter 1035. Under the control of the controller 1015, the MS manager 1010 performs the operations of the RS illustrated in FIGS. 6 and 8. The controller 1015 performs corresponding operations on the basis of information received from the MS manager 1010. The encoder 1020 encodes and modulates data from the MS manager 1010 in accordance with a predetermined MCS level. The OFDM modulator 1025 IFFT-processes data from the encoder 1020 to output sample data (OFDM symbols). The DAC 1030 converts the sample data into an analog signal. The RF transmitter 1035 converts the analog signal received from the DAC 1030 into an RF signal and transmits the RF signal through an antenna.

FIG. 10B is a block diagram of a receiver of the RS according to an embodiment of the present invention.

Referring to FIG. 10B, the receiver of the RS comprises an RF receiver 1050, an ADC 1055, an OFDM demodulator 1060, a decoder 1070, an MS manager 1010, and a controller 1015. The RF receiver 1050 receives an RF signal through an antenna, converts the RF signal into a baseband analog signal, and outputs a power value to the MS manager 1010. The ADC 1055 converts the analog signal received from the RF receiver 1050 into sample data. The OFDM demodulator 1060 FFT-processes the sample data received from the ADC 1055 to output frequency-domain data. Also, the OFDM demodulator 1060 provides a modulation rate to the MS manager 1010. The decoder 1070 selects desired data (burst data) from the frequency-domain data received from the OFDM demodulator 1060, and demodulates and decode the selected data in accordance with a predetermined MCS level. Under the control of the controller 1015, the MS manager 1010 performs the operations of the RS illustrated in FIGS. 6 and 8. The functions of the controller 1015 and the MS manager 1010 of FIG. 10B are identical to those of FIG. 10A.

In the above configurations, the controller 1015 is a protocol controller to control the MS manager 1010. That is, the controller 1015 may be configured to also perform the functions of the other units including the MS manager 1010. Although separate units are provided for the respective functions of the controller 1015, the controller 1015 may be configured to perform all or some of the functions on behalf of such separate units.

FIG. 11A is a diagram illustrating user QoS satisfaction rates with no RS.

Referring to FIG. 11A, if there is no RS, it can be seen that many users are unsatisfied with data rate features but are satisfied with delay features.

FIG. 11B is a diagram illustrating user QoS satisfaction rates with a conventional RS.

Referring to FIG. 11B, if there is a conventional RS, it can be seen that there are some users with increased data rates, while there are other users with insufficient data rates. Also, it can be seen that the number of delay-unsatisfied users increases in comparison with the case of no RS.

FIG. 11C is a diagram illustrating user QoS satisfaction rates with a proposed RS according to an exemplary embodiment of the present invention.

Referring to FIG. 11C, it can be seen that the number of QoS-satisfied users is greatest, if the present invention is used.

Figure 12:
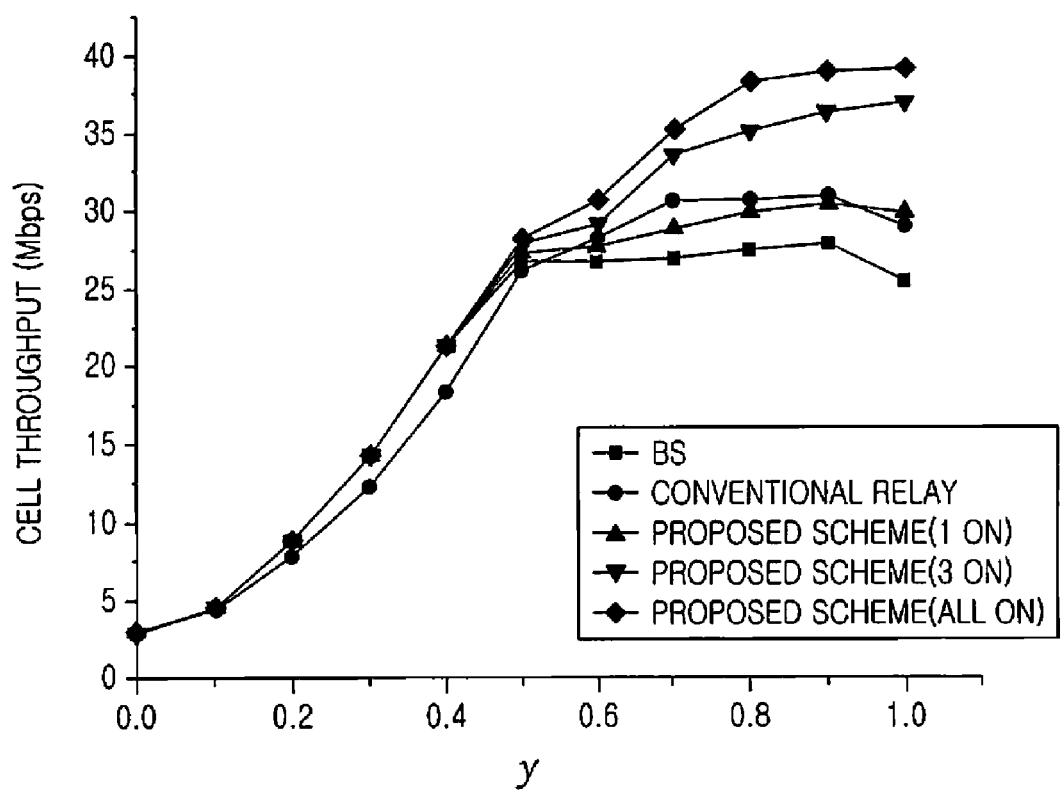
FIG. 12 is a diagram illustrating a cell throughput change according to an embodiment of the present invention.

FIG. 12 is a diagram illustrating a cell throughput change according to an embodiment of the present invention.

Referring to FIG. 12, it can be seen that the total cell throughput according to the present invention is increased over that of the conventional art, as the percentage of users requiring high data rates in a cell increases.

Figure 13:
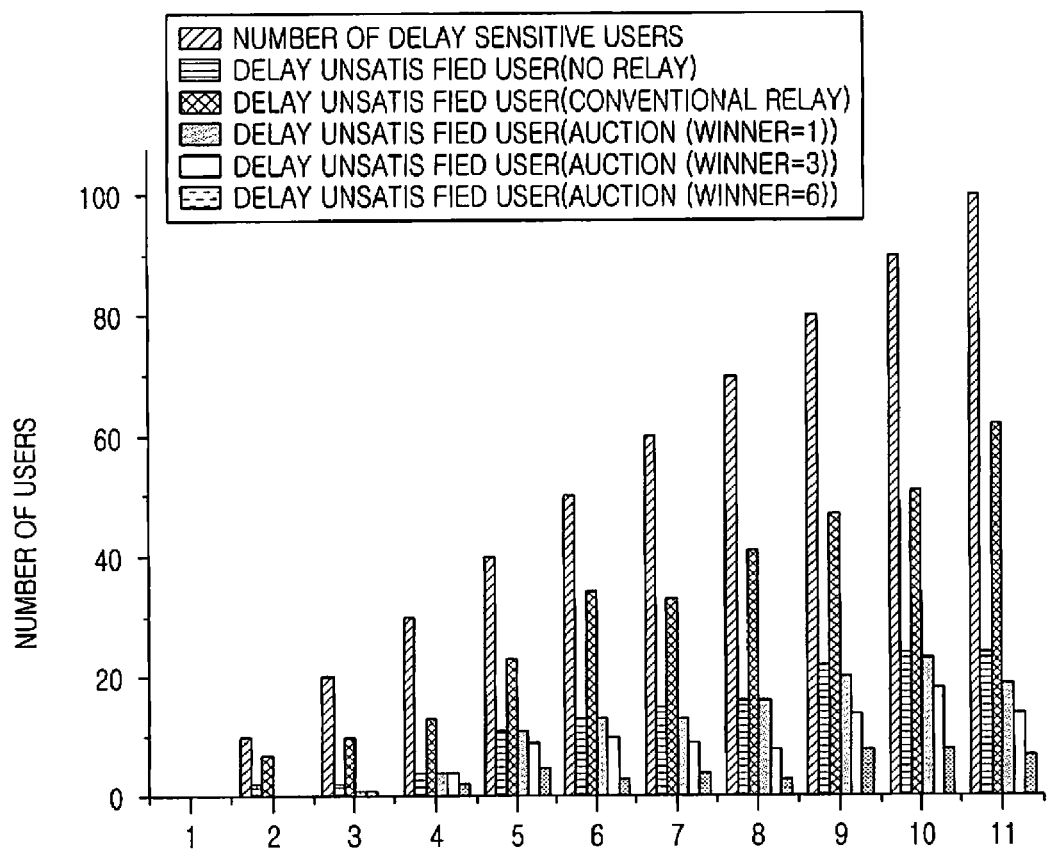
FIG. 13 is a diagram illustrating a change in the number of delay unsatisfied users according to an embodiment of the present invention.

FIG. 13 is a diagram illustrating a change in the number of delay unsatisfied users according to an embodiment of the present invention.

FIG. 13 illustrates the ratio of the number of users unsatisfied with delay requirements in the current communication environment to the number of users sensitive to the delay conditions in a cell. Herein, it can be seen that the present invention satisfies the users' delay requirements better than the conventional art.

According to user QoS satisfaction levels for current services, the present invention selects users to use an RS from users located in an RS coverage area. The BS selects a set of the best RSs that cause the less interference influence on the adjacent cell and provide the higher improvement. The BS activates the RS set to the active mode and deactivates the other RSs to the standby mode, thereby making it possible to efficiently increase the user QoS satisfaction levels.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being comprised in the present invention.

What is claimed is:

1. A method for a Base Station (BS) to select a Relay Station (RS) mode in a wireless communication system, the method comprising:
receiving bidding values from a set of RSs covered by the BS;

determining a winning RS of at least one auction based on of the bidding values and interference information of the set of RSs;

setting the winning RS to operate in an active mode; and resetting the winning RS to operate in a standby mode, when a number of users of the winning RS is less than a first threshold value.

2. The method of claim 1, further comprising resetting the winning RS to operate in the standby mode when an interference of the winning RS is greater than a second threshold value.

3. The method of claim 1, further comprising ordering a link of a user to be connected with the BS if a quality of a link between the BS and the user served by the winning RS is greater than a quality of a link between the winning RS and the user.

4. The method of claim 1, further comprising, before receiving the bidding values:

periodically receiving from adjacent RSs information about a subcarrier band with a severe interference in the BS; and detecting adjacent BSs located most adjacent to the set of RSs.

5. The method of claim 4, further comprising:

determining a power sensing threshold value for each user served by the set of RSs according to a number of subcarrier bands where cell interference caused by the set of RSs is dominant and interference reported from the adjacent BSs is greater than a reference value;

determining information about an allowed delay and an allowed data rate for each user served by the set of RSs; and transmitting the determined power sensing threshold value, the allowed data rate information, and the allowed data rate information, and the location information of users served by the RS set to the set of RSs.

6. The method of claim 1, wherein determining the winning RS of the at least one auction comprises:

determining one RS of the set of RSs to be a winner of the auction if a number of intersections between the subcarrier band reported from the adjacent BS and a subcarrier band to be allocated to the one RS of the set of RSs is less than a first allowable threshold value; and determining an other RS to be the winner of the auction if the one RS of the set of RSs is the winner of the auction and if the number of intersections between the subcarrier band reported from the adjacent BS and the subcarrier band to be allocated to the other RS of the set of RSs is less than a second allowable threshold value.

7. The method of claim 6, wherein the second allowable threshold value is the difference between the first allowable threshold value and the number of intersections between the subcarrier band reported from the adjacent BS and the subcarrier band to be allocated to the one RS of the set of RSs.

8. An apparatus of a Base Station (BS) for selecting a Relay Station (RS) mode in a wireless communication system, the apparatus comprising:

a receiver unit receiving bidding values from a set of RSs covered by the BS; and a controller unit determining a winning RS of at least one auction based on of the bidding values and interference information of the set of RSs, setting the winning RS to operate in an active mode, and resetting the winning RS to operate in a standby mode when a number of users of the winning RS is less than a first threshold value.

9. The apparatus of claim 8, wherein the controller unit resets the winning RS to operate in the standby mode when an interference of the winning RS is greater than a second threshold value.

10. The apparatus of claim 8, wherein the controller unit orders a link of a user to be connected with the BS if a quality of a link between the BS and the user served by the winning RS is greater than a quality of a link between the winning RS and the user.

11. The apparatus of claim 8, wherein before receiving the bidding values, the controller unit periodically receives from adjacent RSs information about a subcarrier band with a severe interference in the BS, and detects adjacent BSs located most adjacent to the set of RSs.

12. The apparatus of claim 11, wherein the controller unit:

determines a power sensing threshold value for each user served by the set of RSs according to a number of subcarrier bands where cell interference caused by the set of RSs is dominant and interference reported from the adjacent BSs is greater than a reference value;

determines information about an allowed delay and an allowed data rate for each user served by the set of RSs; and transmits the determined power sensing threshold value, the allowed data rate information, and the allowed data rate information, and the location information of users served by the RS set to the set of RSs.

13. The apparatus of claim 8, wherein the controller unit:

determines one RS of the set of RSs to be winner of the auction if a number of intersections between the subcarrier band reported from the adjacent BS and a subcarrier band to be allocated to the one RS of the set of RSs is less than a first allowable threshold value; and determines an other RS to be the winner of the auction if the one RS of the set of RSs is the winner of the auction and if the number of intersections between the subcarrier band reported from the adjacent BS and the subcarrier band to be allocated to the other RS of the set of RSs is less than a second allowable threshold value.

14. The apparatus of claim 13, wherein the second allowable threshold value is the difference between the first allowable threshold value and the number of intersections between the subcarrier band reported from the adjacent BS and the subcarrier band to be allocated to the one RS of the set of RSs.

* * * * *